United States Patent [19]

Long

[11] 4,423,668
[45] Jan. 3, 1984

[54] UNIVERSAL AIR DEFLECTOR

[76] Inventor: Alvin L. Long, Civilian Gen. Del., Beale A.F.B., Calif. 95903

[21] Appl. No.: 310,622

[22] Filed: Oct. 13, 1981

Related U.S. Application Data

[63] Continuation-in-part of Ser. No. 91,730, Nov. 8, 1979, abandoned, which is a continuation-in-part of Ser. No. 917,953, Jun. 22, 1978, abandoned.

[51] Int. Cl.³ .............................................. B60J 1/20
[52] U.S. Cl. ................................................... 98/2.12
[58] Field of Search ...................... 98/2.12, 2.13, 99.3, 98/99.4, 44; 49/70; 296/91

[56] References Cited

U.S. PATENT DOCUMENTS

| | | | |
|---|---|---|---|
| 759,940 | 5/1904 | Thompson | 98/44 |
| 2,084,385 | 6/1937 | Conley et al. | 98/2.12 |
| 2,550,619 | 4/1951 | Sutherland | 98/2.12 |
| 2,586,090 | 2/1952 | Riggs | 98/2.13 |
| 2,764,928 | 10/1956 | Martinson | 98/2.12 |
| 2,919,638 | 1/1960 | Mathews | 98/2.13 |
| 3,915,078 | 10/1975 | Woods | 98/2.12 |
| 4,134,612 | 1/1979 | Nelson | 98/2.12 |
| 4,202,254 | 5/1980 | Long | 98/2.12 |

*Primary Examiner*—Albert J. Makay
*Assistant Examiner*—Harold Joyce

[57] ABSTRACT

The bottom of a L-shaped air deflector is held against the top of an inverted L-shaped holding device by a bolt and wingnut. Adjustment holes in the horizontal part of the air deflector and holding device allow adjustment of the air deflector forward or backward and inboard or outboard on the holding device. The holding device can be inserted in the window well of any vehicle.

1 Claim, 2 Drawing Figures

UNIVERSAL AIR DEFLECTOR

This application is a continuation-in-part application of Ser. No. 091,730, filed Nov. 8, 1979 now abandoned which is a continuation-in-part application of Ser. No. 917,953, filed June 22, 1978 now abandoned.

SUMMARY OF THE DISCLOSURE

The present invention relates to air deflectors that can be inserted in the window well of a vehicle door.

Many vehicles on the road today were constructed without air deflectors in their side door window openings, also many of these vehicles do not have air conditioning. Many people would like to have an air deflector in the side door of their vehicles to direct air currents where they want them on a hot day.

The prior art indicates an air deflector that can be inserted in the window well of a side door; however, none are adjustable.

The present invention is adjustable to any angle of air deflection and adjustment holes in the horizontal part of the air deflector and holding device allow adjustment of the air deflector forward or backward and inboard or outboard on the holding device. The present invention is considered an improvement in the art.

DETAILED DESCRIPTION OF THE DRAWINGS

Figure 1:
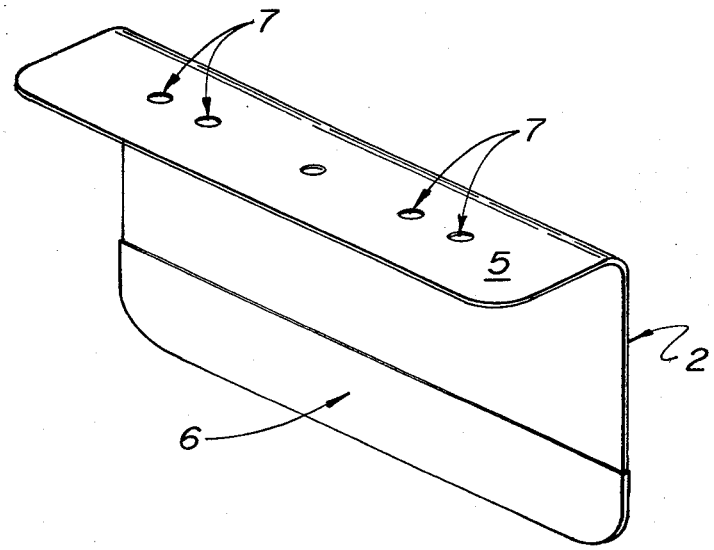
FIG. 1 shows the one piece construction of the air deflector-holding device.

In the drawings, FIG. 1 shows a holding device 2 that is shaped like an inverted L. The lower portion of the inverted L is coated with a high friction material 6 such as rubber and can be inserted in the window well of any vehicle. The high friction material 6 will prevent the air deflector 1 from being dislodged by a sudden gust of wind. To further prevent the air deflector from being dislodged, the holding device 2 is inserted in the forward extremity of a window well and the window is raised until its front edge touches the horizontal angle of the holding device 2. The front extremity of most front window openings are triangularly shaped. Therefore, when the window is raised approximately half-way there is an opening of approximately six inches between the front extremity of the window and the front extremity of the window opening at the threshold level. If the holding device 2 is gently held between the front extremity of the window opening and the front extremity of the window it can not be dislodged by the wind.

Figure 2:
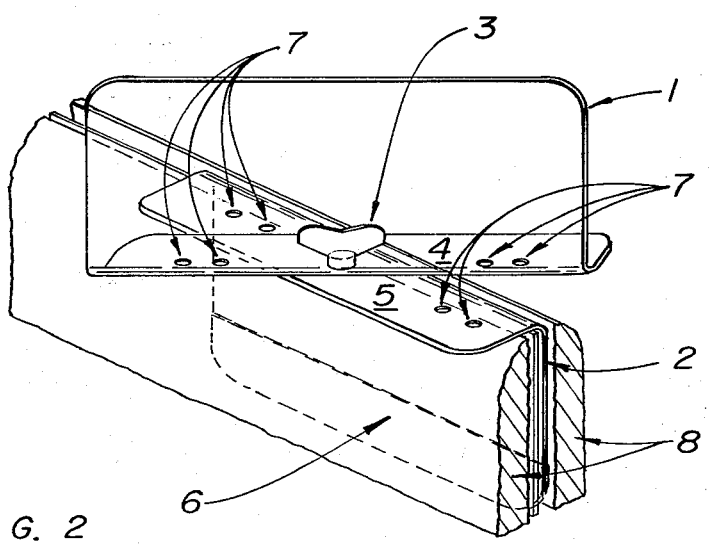
FIG. 2 shows two pieces of the present invention placed together to form an air deflector for vehicles.

FIG. 2 shows a holding device 2 as shown in FIG. 1 with an L-shaped air deflector 1 applied to it. Adjustment holes 7 in the horizontal portion 5 of the holding device 2 are lined up with the adjustment holes 7 in the horizontal portion 4 of the air deflector 1. A bolt with wingnut 3 inserted through the adjustment holes 7 allows for adjustment of the air deflector forward or backward on the holding device 2 as well as outboard or inboard.

The holding device 2 is generally placed in the front extremity of a side door window well and behind the side view mirror. The vertical blade of the holding device 2 is inserted in the window well beside the lowered window.

Side view mirrors are not always located in the same position on the door 8; therefore, it may be necessary to change the position of the air deflector 1 on the holding device 2. In cases where there is very little room between the front of the window opening and the back of the side view mirror, the air deflector must be moved to the most forward adjustment hole 7 on the holding device to allow the air deflector a position where it can work. The angle of air deflection can be changed by loosening the wingnut and pushing on the air deflector.

To increase the amount of air flow into a vehicle the air deflector 1 can be moved outboard by use of the adjustment holes 7. By removing the wingnut and bolt 3 the air deflector is advanced one hole and the bolt and wingnut replaced; thus, air deflection is increased in response to the vehicle's forward movement.

The holding device 2 and the air deflector 1 are identical in size and shape. The air deflector can be used as the holding device 2 and the holding device 2 can be used as the air deflector 1.

In mass production only one piece is manufactured other than the bolt and wingnut.

What is claimed is:

1. In an air deflector device for use across the threshold of a window opening of a vehicle, comprising; an L-shaped air deflector member having adjustment holes in the horizontal portion of the member, an identical inverted L-shaped holding member having adjustment holes in the horizontal portion that mate with selected holes of the L-shaped air deflector member, the vertical portion of the inverted holding member being insertable into a window well, a bolt insertable into the selected mating holes of the two members for pivotal adjustment of the L-shaped air deflector member relative to the inverted L-shaped holding member to allow the angle of air adjustment to be changed as well as the inboard and outboard positions of the air deflector member on the holding member, a wing nut for securing the bolt and the L-shaped member in its adjusted position, the vertical portion of the holding member being coated with high friction rubber material to prevent slippage or dislodgement when inserted into the window well.

* * * * *